United States Patent
Griffin et al.

(10) Patent No.: US 12,335,396 B2
(45) Date of Patent: Jun. 17, 2025

(54) SUPERPOSITIONED QUBITS AS FINITE TOKEN GENERATORS FOR AUTHENTICATION

(71) Applicant: Red Hat, Inc., Raleigh, NC (US)

(72) Inventors: Leigh Griffin, Waterford (IE); Stephen Coady, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 139 days.

(21) Appl. No.: 18/319,944

(22) Filed: May 18, 2023

(65) Prior Publication Data

US 2024/0388434 A1    Nov. 21, 2024

(51) Int. Cl.
*H04L 29/06*    (2006.01)
*H04L 9/08*    (2006.01)
*H04L 9/32*    (2006.01)

(52) U.S. Cl.
CPC .......... *H04L 9/3213* (2013.01); *H04L 9/0852* (2013.01)

(58) Field of Classification Search
None
See application file for complete search history.

(56) References Cited

U.S. PATENT DOCUMENTS

| | | | |
|---|---|---|---|
| 9,436,436 B2* | 9/2016 | Humble | G06F 7/588 |
| 11,121,878 B2 | 9/2021 | McCarty et al. | |
| 11,442,698 B2* | 9/2022 | Nordholt | H04L 9/0852 |
| 11,601,266 B1* | 3/2023 | Stapleton | G06F 21/72 |
| 12,200,480 B2* | 1/2025 | Low | H04L 9/0662 |
| 2012/0221615 A1* | 8/2012 | Cerf | G06F 7/588 708/250 |
| 2015/0227343 A1* | 8/2015 | Humble | G06F 7/588 708/255 |
| 2017/0126654 A1 | 4/2017 | Fu | |
| 2019/0220250 A1* | 7/2019 | Shi | G06F 7/584 |
| 2020/0233645 A1* | 7/2020 | Nordholt | G06F 7/588 |
| 2020/0387821 A1* | 12/2020 | Griffin | G06F 21/6209 |
| 2021/0058244 A1 | 2/2021 | Jacak et al. | |

(Continued)

OTHER PUBLICATIONS

Michael Wahl, Matthias Leifgen, Michael Berlin, Tino Röhlicke, Hans-Jürgen Rahn, Oliver Benson; An ultrafast quantum random number generator with provably bounded output bias based on photon arrival time measurements. Appl. Phys. Lett. Apr. 25, 2011; 98 (17): 171105. (Year: 2011).*

(Continued)

*Primary Examiner* — Jeffery L Williams
(74) *Attorney, Agent, or Firm* — Dority & Manning, P.A.

(57) ABSTRACT

An instance of the quantum token generating service is instantiated responsive to a request for instantiation of a quantum token generating service from an authenticating computing system. Instantiation of the instance of the quantum token generating service includes reserving a set of qubits for the instance of the quantum token generating service that are accessible to the authenticating computing system. It is determined that the authenticating computing system has accessed the set of qubits via the instance of the quantum token generating service to generate a first token. Electromagnetic bias is applied to a qubit of the set of qubits to weight the qubit such that each subsequent token generated with the instance of the quantum token generating service is different than the first token.

13 Claims, 5 Drawing Sheets

(56) References Cited

U.S. PATENT DOCUMENTS

| | | | | |
|---|---|---|---|---|
| 2024/0323003 A1* | 9/2024 | Stapleton | .............. | H04L 9/3226 |
| 2024/0388434 A1* | 11/2024 | Griffin | .................. | H04L 9/0852 |
| 2025/0023720 A1* | 1/2025 | Lim | ..................... | H04L 9/0852 |
| 2025/0045609 A1* | 2/2025 | Sadeghi Esfahani | .... | G06N 7/01 |

OTHER PUBLICATIONS

Blanco, Paula Alonso, et al., "Quantum Resistant Authentication Methods for Quantum Key Distribution," Master's Thesis, SandboxAQ and Universitat de Barcelona, http://hdl.handle.net/2445/188221, Jul. 2022, 31 pages.

Fehr, Serge, et al., "Quantum Authentication and Encryption with Key Recycling Or: How to Re-use a One-Time Pad Even if P=NP—Safely & Feasibly," Annual International Conference on the Theory and Applications of Cryptographic Techniques, http://arxiv.org/abs/1610.05614v3, May 19, 2017, 20 pages.

Murray, Hazel, et al., "Quantum Multi-factor Authentication," Emerging Technologies for Authorization and Authentication (pp. 50-67), https://doi.org/10.1007/978-3-030-93747-8_4, Jan. 2021, 18 pages.

Sharma, Neha, "Emerging Trends of Quantum ComputingThe Emerging Trends of Quantum Computing Towards Data Security and Key Management," Archives of Computational Methods in Engineering, DOI:10.1007/s11831-021-09578-7, Apr. 2021, 15 pages.

\* cited by examiner

SUPERPOSITIONED QUBITS AS FINITE TOKEN GENERATORS FOR AUTHENTICATION

BACKGROUND

Quantum computing utilizes qubits to perform quantum calculations. A major advantage to quantum computing generally, and the use of qubits specifically, is that qubits provide the capability to generate truly random numbers. By using qubits for random number generation, the security provided by many cryptographic services is greatly enhanced.

SUMMARY

Implementations of the present disclosure are directed to superpositioned qubits as finite token generators. For example, an instance of a quantum token generating service can be instantiated by reserving a set of qubits. The qubits can be placed in superposition, and an authenticating computing system can access the qubits via the instance of the service to generate a token based on the state values of the qubits in superposition. Electromagnetic bias can then be applied to some (or all) of the qubits to ensure that subsequent tokens are each unique.

In one implementation, a computer-implemented method is provided. The method includes, responsive to a request for instantiation of a quantum token generating service from an authenticating computing system, instantiating, by a quantum computing system comprising one or more processing devices, an instance of the quantum token generating service, wherein instantiating the instance of the quantum token generating service comprises reserving, by the quantum computing system, a set of qubits for the instance of the quantum token generating service that are accessible to the authenticating computing system. The method includes receiving, by the quantum computing system, information indicating that the authenticating computing system has accessed the set of qubits via the instance of the quantum token generating service to generate a first token. The method includes applying, by the quantum computing system, electromagnetic bias to a qubit of the set of qubits to weight the qubit such that each subsequent token generated with the instance of the quantum token generating service is different than the first token.

In another implementation, a computer system is provided. The computer system includes one or more computing devices. The one or more computing devices are to provide a request to a quantum computing system for instantiation of an instance of a quantum token generating service, wherein the request is indicative of a maximum number of tokens N to be generated with the instance of the quantum token generating service. The one or more computing devices are further to receive, from the quantum computing system, information indicative of a set of qubits reserved for the instance of the quantum token generating service. The one or more computing devices are further to, for each of N iterations, access the set of qubits via the instance of the quantum token generating service to generate a token, wherein the token is based on a state of superposition of the set of qubits, and wherein the token is different than any previous token generated in a prior iteration, and provide the token to a requesting entity.

In another implementation, a non-transitory computer-readable storage medium is provided. The non-transitory computer-readable storage medium includes executable instructions to cause one or more processor devices of a quantum computing system to, responsive to a request for instantiation of a quantum token generating service from an authenticating computing system, instantiate an instance of the quantum token generating service, wherein instantiating the instance of the quantum token generating service comprises reserving a set of qubits for the instance of the quantum token generating service that are accessible to the authenticating computing system. The one or more processor devices are further to receive information indicating that the authenticating computing system has accessed the set of qubits via the instance of the quantum token generating service to generate a first token. The one or more processor devices are further to apply electromagnetic bias to a qubit of the set of qubits to weight the qubit such that each subsequent token generated with the instance of the quantum token generating service is different than the first token.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
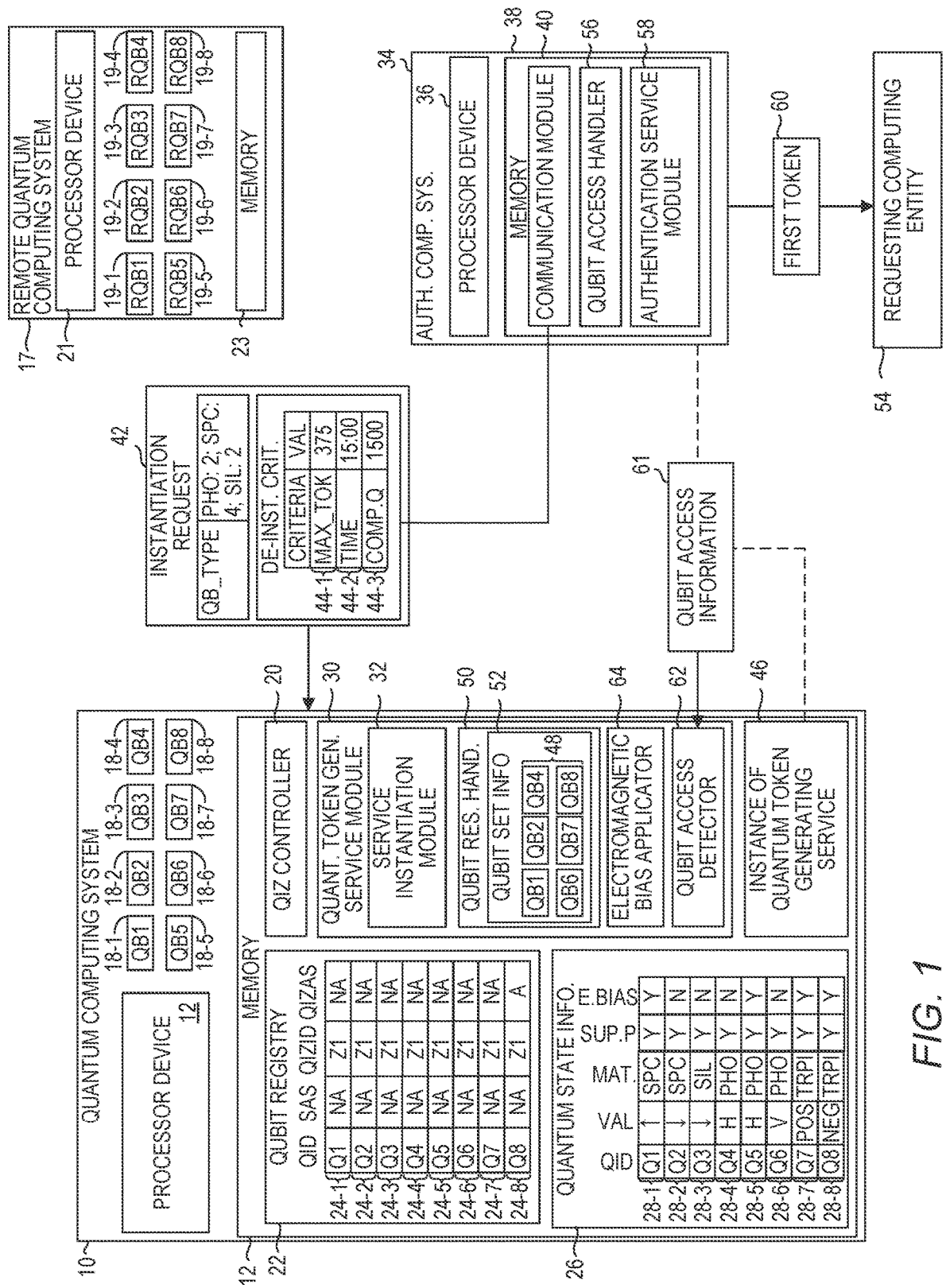
FIG. 1 is a block diagram of an environment suitable for instantiating a quantum token generating service to facilitate access to superpositioned qubits as finite token generators according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Quantum computing utilizes qubits to perform quantum calculations. A major advantage to quantum computing generally, and the use of qubits specifically, is that qubits provide the capability to generate truly random numbers. By using qubits for random number generation, the security provided by many cryptographic services is greatly enhanced. However, due to the substantial costs associated with maintaining and implementing even a single qubit, qubits can be a finite resource within quantum computing environments. Further, because the development of quantum computing is still in its nascent stages, many different technologies have been developed to implement qubits, each with their own advantages and disadvantages.

Due to the various discrepancies between quantum computing devices, it can be advantageous to manage qubit access and utilization through a centralized entity. Such an entity can instantiate and de-instantiate qubits according to specific requests for certain services and overall network demand. Many centralized entities will offer subscription-based models for access to qubits, either directly or through intermediary service instances. For example, a requesting entity may request that a centralized entity instantiate a quantum computing service that uses a particular type of qubit. In response, the centralized entity can locate qubits of the particular type across a number of networked quantum computing devices (e.g., due to the relative scarcity of qubits) and instantiate the requested service using the located qubits.

However, such approaches present a variety of problems. First, subscription-based models can cause a number of security vulnerabilities due to the exchange of communications between the centralized entity and requesting entities. For example, a token generated by a centralized entity based on qubits accessed by the centralized entity is at risk of interception by malicious entities when the token is communicated to a requesting entity. Second, such approaches conventionally limit the amount of qubit information that is accessible to requesting entities, therefore reducing the available sources of information for implementation of multi-factor authentication techniques. For example, a requesting entity may wish to request a number of qubits of a particular type so that certain parameters of the qubits can be used for multi-factor authentication (e.g., spin, phase, etc.). However, if the requesting entity only receives the token without the capacity to directly access the qubits, the requesting entity has no way to verify the actual state of the qubits at the time of token generation.

Accordingly, implementations of the present disclosure propose superpositioned qubits as finite token generators for authentication. More specifically, a quantum computing system (e.g., a computing system that includes or otherwise accesses qubits, etc.) can receive a request from an authenticating computing system that provides authentication services to users. The authenticating computing system can request that the quantum computing system instantiates a quantum token generating service. In response, the quantum computing system can instantiate the quantum token generating service by reserving a set of qubits for the quantum token generating service. The quantum computing system can, in some implementations, also convey direct access permissions for the qubits to the authenticating service. The quantum computing system can place the set of qubits in a state of superposition so that they can be utilized for generation of a token.

Once instantiated, the instance of the quantum token generating service can facilitate access to the qubits along with the access permissions. For example, the authenticating computing system can access the set of qubits in superposition via the instance of the quantum token generating service, and based on the current state of the qubits, can generate a token that is cryptographically secured via quantum random number generation. The authenticating computing system can provide the token to authenticate users for the service managed by the authenticating computing system.

It is advantageous from a security perspective that a token generated using a token generating service is never identical to a token that was previously generated using the same service. As such, when the quantum computing system determines that the authenticating computing system has accessed the set of qubits, the quantum computing system can apply an electromagnetic bias to one of the qubits of the set of qubits. This electromagnetic bias can weight the qubit such that each subsequent token generated with the quantum token generating service is different than the first token.

The quantum computing system can apply electromagnetic bias to a qubit of the set of qubits each time a token is generated using the instance of the quantum token generating service until the quantum computing system determines that the instance of the quantum token generating service is to be de-instantiated. For example, the request to instantiate the quantum token generating service received from the authenticating computing system may have specified a number of tokens to be generated using the instance of the quantum token generating service. If the quantum computing system determines that this number of tokens has been generated, the quantum computing system can de-instantiate the instance of the quantum token generating service.

To de-instantiate the quantum token generating service, the quantum computing system can release the reserved set of qubits so that other quantum computing system(s) or device(s) can subsequently access the qubits. In such fashion, the quantum computing system can dynamically instantiate and de-instantiate the instance of the quantum token generating service while providing direct access to qubits, therefore facilitating multi-factor authentication while reducing, or eliminating, the security vulnerabilities inherent to conventional approaches to cryptographic token generation using qubits.

Implementations of the present disclosure provide a number of technical effects and benefits. As one example technical effect and benefit, conventional approaches to cryptographic token generation using qubits creates a number of security vulnerabilities, such as the risk of token interception or the reduction of available information for implementation of multi-factor authentication. Such security vulnerabilities can have drastic consequences that may require substantial compute resources (e.g., power, compute cycles, memory, storage, bandwidth, etc.) to remedy, such as applying heavy encryption protocols to a channel over which a token is communicated. However, by facilitating direct access to qubits for token generation, implementations of the present disclosure eliminate such vulnerabilities and the associated expenditure of qubit resources to remedy them.

FIG. 1 is a block diagram of an environment suitable for instantiating a quantum token generating service to facilitate access to superpositioned qubits as finite token generators according to some implementations of the present disclosure. A quantum computing system 10 can include processor device(s) 12 and memory 14. In some implementations, the quantum computing system 10 may be a computing system that includes multiple computing devices. Alternatively, in some implementations, the quantum computing system 10 may be one or more computing devices within a computing system that includes multiple computing devices. Similarly, the processor device(s) 12 may include any computing or electronic device capable of executing software instructions to implement the functionality described herein.

In particular, the quantum computing system 10 operates in a quantum environment but can operate using classical computing principles or quantum computing principles. When using quantum computing principles, the quantum computing system 10 performs computations that utilize quantum-mechanical phenomena, such as superposition and entanglement. The quantum computing system 10 may operate under certain environmental conditions, such as at or near 0° Kelvin. When using classical computing principles, the quantum computing system 10 utilizes binary digits that have a value of either 1 or 0.

The quantum computing system 10 includes at least one processor device(s) 12 and at least one memory 14. The quantum computing system 10 implements eight qubits 16-1-16-8 (generally, qubits 16). It should be noted that, in some implementations, one or more of the qubits 16 may be located on a quantum computing device or system located remotely from the quantum computing system 10. For example, qubits 16-1-16-6 may be located at or within the quantum computing system 10. Qubits 16-7-16-8 may be located at a remote quantum computing system 17. For example, the remote quantum computing system 17 can include remote qubits 19-1-19-8 (generally, remote qubits 19). The remote quantum computing system 17 may allocate remote qubits 19-7-19-8 to serve as qubits 16-7-16-8. The remote computing system can also include a processor device 21 and memory 23 as described with regards to the processor device(s) 12 and the memory 14 of the quantum computing system 10. The qubits 16-7-16-8 may process information remotely at the remote computing system 18, which may in turn communicate processed information to the quantum computing system 10 (e.g., via one or more networks, etc.). In such fashion, the quantum computing system 10 may increase a quantum processing capacity by leveraging remotely located qubits.

The memory 14 can be or otherwise include any device(s) capable of storing data, including, but not limited to, volatile memory (random access memory, etc.), non-volatile memory, storage device(s) (e.g., hard drive(s), solid state drive(s), etc.). For example, the memory 14 can include various types of containerized units of software instructions (i.e., "packaged containers"), scripts, modules, etc.

In some implementations, the quantum computing system 10 can implement a Quantum Isolation Zone (QIZ) using QIZ controller 20. In particular, the QIZ controller 20 can be utilized to implement quantum processes or services, such as a quantum token generating service, within a QIZ. QIZs have been proposed for isolation of quantum processes. QIZs ensure that a quantum process can only access qubits allocated to the QIZ in which the quantum process executes, and has no visibility to or ability to access qubits allocated to other QIZs or that are otherwise implemented on the quantum computing system. Additionally, quantum process relationship graphs have been proposed to facilitate visibility of qubits by a plurality of quantum processes that execute within a QIZ and that have relationships with one another.

More generally, the QIZ controller 20 can be utilized to implement quantum services in a manner analogous to a controller of virtualized compute instances used in contemporary computing environments. For example, the QIZ controller 20 may implement an instance of a service, such as a quantum token generating service, as a QIZ such that qubits reserved for the quantum token generating service can only be accessed by entities with permission to access the qubits, such as an authenticating entity to which access has been provided.

In some implementations, the memory 14 of the quantum computing system 10 can include a qubit registry 22 that maintains information about the qubits 16-1-16-8, including, by way of non-limiting example, a total qubits counter that identifies the total number of qubits 16 implemented by the quantum computing system 10, a total available qubits counter that maintains count of the total number of qubits 16 that are currently available for allocation, etc.

In some implementations, the qubit registry 22 can also maintain qubit metadata records 24-1-24-8 (generally, metadata records 24), each of which maintains information about a corresponding qubit 16-1-16-8. Each metadata record 24 includes a qubit identifier (QID) that contains an identifier of the qubit 16-1-16-8 to which the respective metadata record 24 corresponds, a system availability status (SAS) that identifies whether the corresponding qubit 16 is available for allocation at the quantum computing system level, a QIZ identifier (QIZID) that identifies the QIZ, if any, to which the corresponding qubit 16 has been allocated, etc.

In some implementations, the memory 14 of the quantum computing system 10 can include quantum state information 26. Quantum state information 26 can include current value records 28-1-28-8. Each current value record 28-1-28-8 can describe current values for quantum state parameter(s) of a respective qubit 16-1-16-8 (e.g., current value record 28-1 can describe current values of quantum state parameter(s) of qubit 16-1, current value record 28-2 can describe current values of quantum state parameter(s) of qubit 18-2, etc.). The quantum state parameter(s) can be any type or manner of parameter associated with the current state of the qubit (e.g., quantum configuration, phase, spin, polarity, position, quantum material, location, latency, etc.).

For example, as depicted, current value record 28-1 can indicate a positive spin value and superconducting quantum material for qubit 16-1. Current value record 28-4 can indicate a horizontal polarity and photonic quantum material for qubit 16-4. In addition, each of the current value records 28 can indicate whether a qubit is in a state of superposition and whether an electromagnetic bias has been applied to a particular qubit during instantiation of a quantum token generating service. These properties of the current value records 28 will be discussed in greater detail with regards to quantum token generating service module 30.

The memory 14 of the quantum computing system 10 can include a quantum token generating service module 30. The quantum token generating service module 30 can be utilized to instantiate, implement, manage, and de-instantiate a quantum token generating service. A quantum token generating service is a service that facilitates generation of authentication tokens using qubits. Because the state parameters of qubits in superposition provide a source of truly random numbers, the use of qubits in generating authentication tokens confers substantial cryptographic advantages.

The quantum token generating service module 30 can include a service instantiation module 32. The service instantiation module 32 can instantiate an instance of the quantum token generating service 46 in response to an instantiation request 42 to instantiate the service.

To follow the depicted example, assume that an authenticating computing system 34 is a computing system that authenticates users before providing access to resources, networks, files, storage devices, etc. The authenticating computing system 34 can include a processor device 36 and a memory 38 as described with regards to the processor device(s) 12 and the memory 14 of the quantum computing system 10. The memory 38 can include a communication module 40. The communication module 40 can generate and transmit an instantiation request 42 to the quantum computing system 10 for instantiation of a quantum token generating service.

In some implementations, the instantiation request 42 can include de-instantiation criteria 44-1-44-N (generally, de-instantiation criteria 44). The de-instantiation criteria 44 can include criteria for de-instantiation of the instance of the quantum token generating service 46. For example, de-instantiation criteria 44-1 can be a maximum number of tokens generated using the instance of the quantum token generating service 46. For another example, de-instantiation criteria 44-2 can be a maximum lifetime for the instance of the quantum token generating service 46. For yet another example, the de-instantiation criteria 44-N can be a maximum quantity of compute resources expended on instantiation and implementation of the instance of the quantum token generating service 46. However, it should be understood that any type or manner of de-instantiation criteria 44 can be provided to the quantum computing system 10 in the instantiation request 42.

Additionally, or alternatively, in some implementations, the instantiation request can indicate a qubit type to include in the set of qubits 48 to be reserved for the instance of the quantum token generating service. For example, the instantiation request 42 may request that a qubit of a first qubit type, such as a photonic qubit type, be included in the set of qubits 48. For another example, the instantiation request 42 may request that all qubits in the set of qubits 48 be silicon qubits. More generally, the instantiation request 42 may request any particular composition of qubits for inclusion in the set of qubits 48 reserved for instantiation of the instance of the quantum token generating service 46.

Upon receipt of the instantiation request 42, the quantum token generating service module 30 can instantiate the instance of the quantum token generating service 46 using the service instantiation module 32. To instantiate the instance of the quantum token generating service 46, the quantum token generating service module 30 can reserve a set of qubits 48 with qubit reservation handler 50. The qubit reservation handler 50 can generate qubit reservation information 52 that reserves the set of qubits 48 based on a variety of factors, including the de-instantiation criteria 44, the availability of qubits 16/19 across the quantum computing system 10 and/or the remote quantum computing system 17, any requested type(s) of qubits indicated by the instantiation request 42, etc. For example, the instantiation request 42 may request that at least one photonic qubit be included in the set of qubits 48. The qubit reservation handler 50 can determine that qubit 18-4 is a photonic qubit that is not currently reserved. The qubit reservation handler 50 can reserve the qubit 18-4 for inclusion in the set of qubits 48. The qubit reservation handler 50 can place the set of qubits 48 in a state of superposition.

In some implementations, the number of qubits for inclusion in the set of qubits can be based on the maximum number of tokens de-instantiation criteria 44-1 of the instantiation request 42. In some implementations, if the de-instantiation criteria 44-1 indicates a maximum number of tokens N to be generated using the instance of the quantum token generating service 46, the qubit reservation handler 50 can reserve M qubits where $2^M = N$. For example, if the de-instantiation criteria 44-1 indicates a maximum number of tokens 8 to be generated using the instance of the quantum token generating service 46, the qubit reservation handler 50 can reserve 3 qubits (e.g., $2^3 = 8$).

In some implementations, the number of tokens generated is only incremented when a token is generated for a valid request for authentication received by the authenticating computing system 34. For example, assume that a malicious entity, such as a botnet, transmits a request for authentication to the authenticating computing system 34. The authenticating computing system 34 can access the set of qubits 48 to generate an authentication token, and can provide the authentication token to the malicious entity. As part of the cryptographic authentication process, the authenticating computing system 34 may detect that the malicious entity is malicious, and can deny authentication. Since the entity was malicious, and the token was not used to handle a valid authentication request, the quantum computing system can determine that the token generated to handle the authentication request does not count towards the maximum number of tokens generated using the set of qubits 48.

The authenticating computing system 34 can access the set of qubits 48 via the instance of the quantum token generating service 46 to generate a token for authentication. For example, assume that a requesting computing entity 54 requests authentication from the authenticating computing system 34. The authenticating computing system 34 can use qubit access handler 56 to access the set of qubits 48 via the instance of the quantum token generating service 46. More specifically, the authenticating computing system 34 can request to access the set of qubits 48. The instance of the quantum token generating service 46 can determine that the authenticating computing system 34 is permitted to directly access the set of qubits 48, and can permit access to the set of qubits 48. The authenticating computing system 34 can directly access the set of qubits 48 to obtain values associated with the set of qubits 48 in the state of superposition (e.g., the values described by the quantum state information 26, etc.). The authenticating computing system 34 can use authentication service module 58 to generate a first token 60 based on the values of the set of qubits 48 in superposition.

In some implementations, the authenticating computing system 34 can access the set of qubits 48 via the instance of the quantum token generating service 46 and can verify that the set of qubits 48 includes a type of qubit requested in the instantiation request 42. For example, if the authenticating computing system 34 requests three photonic qubits to be included in the set of qubits 48, and verifies that three photonic qubits exist in the set of qubits 48 when accessed, the authenticating computing system 34 can utilize such verification to ensure that the quantum computing system 10 is not a malicious entity. The quantum computing system 10 can determine that the authenticating computing system 34 has verified the first qubit type. For example, the quantum computing system 10 can determine that the authenticating computing system 34 has accessed information descriptive of a type of qubit for each qubit of the set of qubits 48.

The quantum token generating service module 30 of the quantum computing system 10 can determine that the authenticating computing system 34 has accessed the set of qubits 48 to generate the first token 60 using qubit access detector 62. For example, the qubit access detector can obtain qubit access information 61. The qubit access information 61 can indicate that the authenticating computing system 34 has accessed the set of qubits 48. For example, the authenticating computing system 34 can provide access credentials to the instance of the quantum token generating service 46. The access credentials can serve as the qubit access information 61, or the instance of the quantum token generating service 46 can provide the qubit access information 61 to the qubit access detector 62. For another example, the qubit access information 61 can be information that tracks access to the set of qubits 48 (e.g., an activity log, etc.). The qubit access detector 62 can periodically analyze the qubit access information 61 to determine whether the authenticating computing system 34 has accessed the set of qubits 48.

Once the quantum computing system 10 determines that the authenticating computing system 34 has accessed the set of qubits 48, the quantum token generating service module 30 can apply electromagnetic bias to the set of qubits 48 with electromagnetic bias applicator 64. The electromagnetic bias applicator 64 can apply electromagnetic bias to one (or more) of the set of qubits 48 such that each subsequent token generated with the quantum token generating service is different than the first token 60. This weighting is maintained for the life of the instance of the quantum token generating service 46 so that any token generated using the instance of the quantum token generating service 46 is unique.

The authenticating computing system 34 can access the set of qubits 48 to generate tokens via the instance of the quantum token generating service 46 until one (or more) of the de-instantiation criteria 44 have been satisfied. In some implementations, the quantum computing system 10 can determine that the de-instantiation criteria 44 have been satisfied. For example, the qubit access detector 62 can track the number of instances in which the set of qubits 48 have been accessed. If the number of accesses is equal to the maximum token de-instantiation criteria 44-1, the qubit access detector 62 can determine that the de-instantiation criteria 44-1 has been satisfied. For another example, the quantum token generating service module 30 can track a quantity of time during which the instance of the quantum token generating service 46 has been instantiated. If the quantity of time is greater than the quantity of time indicated by the de-instantiation criteria 44-2, the quantum token generating service module 30 can determine that the de-instantiation criteria 44-2 has been satisfied. For yet another example, the quantum token generating service module 30 can track a quantity of compute resource expenditure associated with the instance of the quantum token generating service 46. If the quantity of compute resource expenditure is greater than the quantity of compute resource expenditure indicated by the de-instantiation criteria 44-3, the quantum token generating service module 30 can determine that the de-instantiation criteria 44-3 has been satisfied.

If one, or more, of the de-instantiation criteria 44 have been satisfied, the quantum computing system can de-instantiate the instance of the quantum token generating service 46. To do so, the quantum computing system 10 can release the reservation on the set of qubits 48 using the qubit reservation handler 50. For example, the qubit reservation handler 50 may modify the qubit reservation information 52 to release the set of qubits 48. Once released, each qubit of the set of qubits 48 can be reserved by other computing entities.

In some implementations, to de-instantiate the instance of the quantum token generating service 46, the electromagnetic bias applicator 64 can remove any weighting applied to the set of qubits 48 via electromagnetic bias so that future utilization of the set of qubits 48 is not affected by electromagnetic bias.

Figure 2:
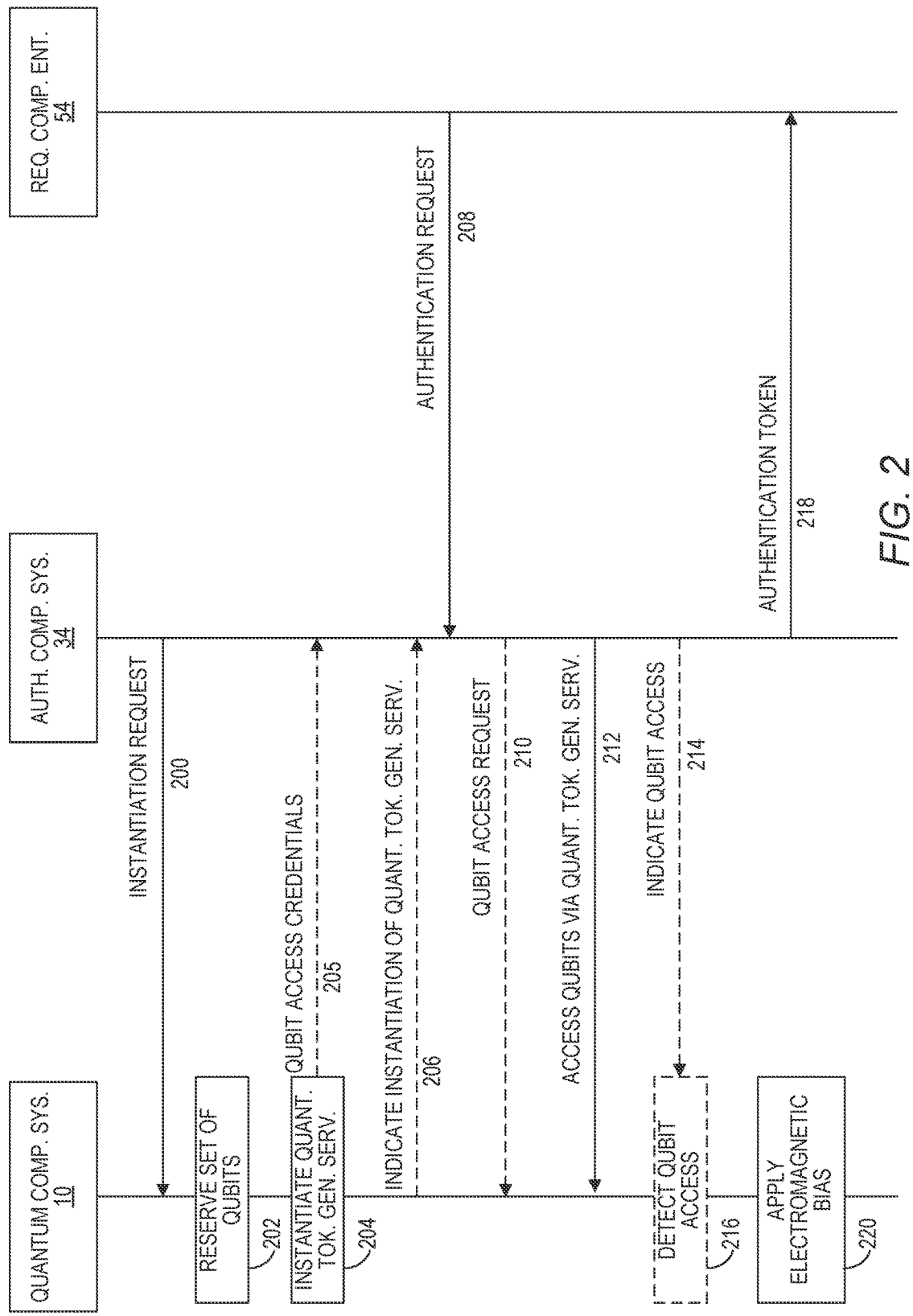
FIG. 2 is a communication flow diagram for facilitating access to superpositioned qubits as finite token generators for authentication according to some implementations of the present disclosure.

FIG. 2 is a communication flow diagram for facilitating access to superpositioned qubits as finite token generators for authentication according to some implementations of the present disclosure. FIG. 2 will be discussed in conjunction with FIG. 1. Specifically, at 200, the authenticating computing system 34 can provide the instantiation request 42 to the quantum computing system 10. In some implementations, the instantiation request 42 can include the de-instantiation criteria 44 and/or can indicate a particular type of qubit for inclusion in the set of qubits 48.

At 202, the quantum computing system 10 can reserve the set of qubits 48 for the instance of the quantum token generating service 46. Qubits can be selected for inclusion in the set of qubits 48 based on the instantiation request 42, and/or a current state of qubits available to the quantum computing system 10 for reservation. At 204, the quantum computing system 10 can instantiate the instance of the quantum token generating service 46. To instantiate the instance of the quantum token generating service 46, the quantum computing system 10 can reserve the set of qubits 48. At 205, in some implementations, the quantum computing system 10 can further provide information to the authenticating computing system 34 that facilitates access to the set of qubits 48. For example, the quantum computing system 10 can provide access credentials that allow direct access to the set of qubits 48 via the instance of the quantum token generating service 46.

In some implementations, at 206, the quantum computing system 10 can indicate to the authenticating computing system 34 that the instance of the quantum token generating service 46 has been instantiated.

At 208, the requesting computing entity (e.g., a user client device, a compute node in a network, etc.) can provide an authentication request to the authenticating computing system 34.

In some implementations, at 210, the authenticating computing system 34 can provide a qubit access request to the quantum computing system 10. The qubit access request can be a request for direct access to read values of the set of qubits 48 in superposition for generation of an authentication token. In some implementations, rather than requesting access to the set of qubits 48 at 210, the authenticating computing system 34 can indicate that it will access the set of qubits 48 via the instance of the quantum token generating service 46. For example, the authenticating computing system 34 can provide access credentials to the instance of the quantum token generating service 46 that enable direct access to the set of qubits 48.

At 212, the authenticating computing system 34 can access the set of qubits 48 via the instance of the quantum token generating service 46. In some implementations, the authenticating computing system 34 can read current state values of the set of qubits 48 in superposition, etc. In some implementations, the authenticating computing system 34 can utilize the values read from the set of qubits 48 as an authentication token. Alternatively, in some implementations, the authenticating computing system 34 can use the values read from the set of qubits 48 as a seed for subsequent generation of an authentication token. Alternatively, in some implementations, the instance of the quantum token generating service 46 can generate an authentication token for the authenticating computing system 34 based on the values read from the set of qubits 48.

In some implementations, at 214, the authenticating computing system 34 can provide qubit access information 61 indicating access of the set of qubits 48 to the quantum computing system 10. For example, the authenticating computing system 34 may access the set of qubits 48, read current state values for the qubits, and then cease to access the set of qubits 48. After the authenticating computing system 34 has ceased to access the set of qubits 48, the authenticating computing system 34 can provide qubit access information 61 to the quantum computing system 10 indicating that the authenticating computing system 34 has stopped accessing the set of qubits 48.

In some implementations, at 216, the quantum computing system 10 can detect that the set of qubits 48 has been accessed by the authenticating computing system 34. For example, the quantum computing system 10 can detect that access credentials provided to the authenticating computing system 34 have been provided to the instance of the quantum token generating service 46. For another example, the quantum computing system 10 can receive the information indicating access from the authenticating computing system 34 at 210.

At 218, the authenticating computing system 34 can provide the token to the requesting computing entity 54.

At 220, the quantum computing system 10 can apply electromagnetic bias to a qubit of the set of qubits 48 such that the token provided to the requesting computing entity at 218 is not identical to any tokens generated subsequently using the instance of the quantum token generating service 46.

Figure 3:
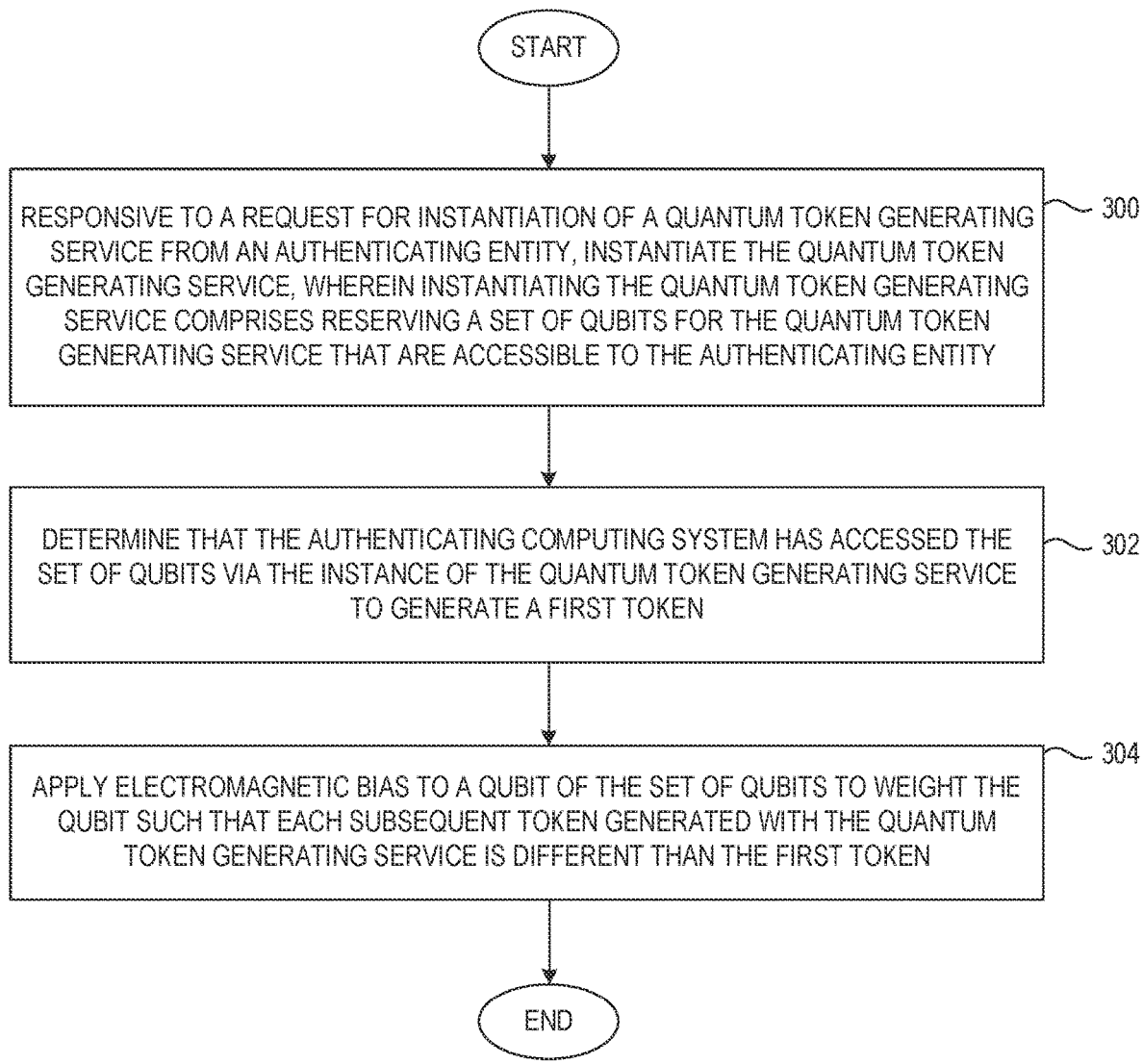
FIG. 3 is a flowchart of a method for instantiating a quantum token generating service to facilitate access to superpositioned qubits as finite token generators according to some implementations of the present disclosure.

FIG. 3 is a flowchart of a method for instantiating a quantum token generating service to facilitate access to superpositioned qubits as finite token generators according to some implementations of the present disclosure. FIG. 2 will be discussed in conjunction with FIG. 1.

Responsive to an instantiation request 42 for instantiation of a quantum token generating service from an authenticating computing system 34, the quantum computing system 10 instantiates an instance of the quantum token generating service 46. To instantiate the instance of the quantum token generating service 46, the quantum computing system 10 reserves a set of qubits 48 for the instance of the quantum token generating service 46 that are accessible to the authenticating computing system 34 (FIG. 3, block 300). It is determined that the authenticating computing system 34 has accessed the set of qubits 48 via the instance of the quantum token generating service 46 to generate a first token 60 (FIG. 3, block 302). Electromagnetic bias is applied to a qubit of the set of qubits 48 by the quantum computing system 10 (e.g., using electromagnetic bias applicator 64, etc.) to weight the qubit such that each subsequent token generated with the instance of the quantum token generating service 46 is different than the first token 60 (FIG. 3, block 304).

Figure 4:
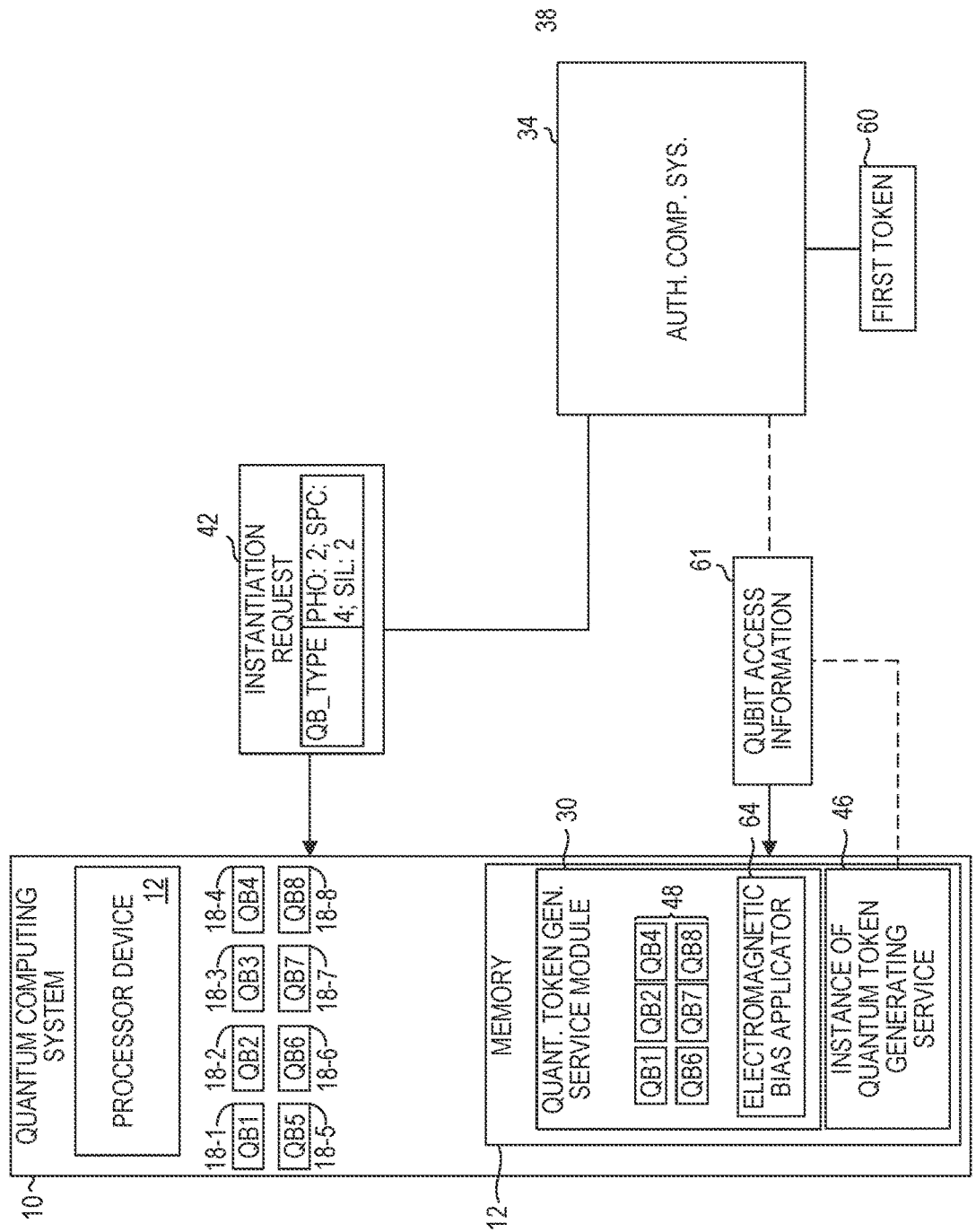
FIG. 4 is a simplified block diagram of the environment illustrated in FIG. 1 according to one implementation of the present disclosure.

FIG. 4 is a simplified block diagram of the environment illustrated in FIG. 1 according to one implementation of the present disclosure. The quantum computing system 10 includes the memory 14 and the processor device(s) 12 coupled to the memory 14. The processor device(s) 12 are to, responsive to an instantiation request 42 for instantiation of a quantum token generating service from an authenticating computing system 34, instantiate the instance of the quantum token generating service 46. Instantiating the instance of the quantum token generating service 46 includes reserving a set of qubits 48 for the quantum token generating service that are accessible to the authenticating computing system 34. The processor device(s) 12 are further to determine that the authenticating computing system 34 has accessed the set of qubits 48 via the instance of the quantum token generating service 46 to generate a first token 60. The processor device(s) 12 are further to apply electromagnetic bias (e.g., via electromagnetic bias applicator 64) to a qubit of the set of qubits 48 to weight the qubit such that each subsequent token generated with the instance of the quantum token generating service 46 is different than the first token 60.

Figure 5:
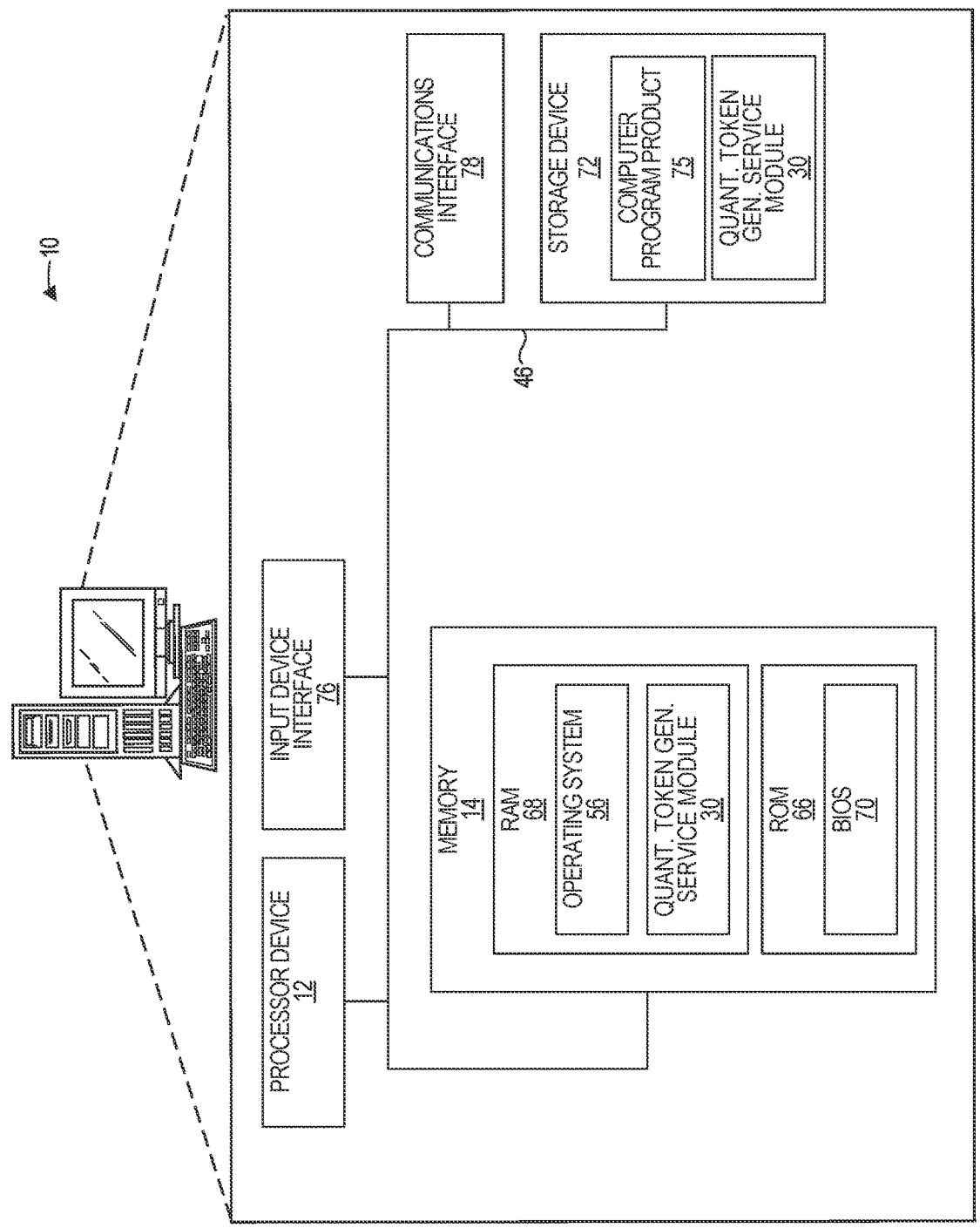
FIG. 5 is a block diagram of the quantum computing system suitable for implementing examples according to one example.

FIG. 5 is a block diagram of the quantum computing system 10 suitable for implementing examples according to one example. The quantum computing system 10 may comprise any computing or electronic device capable of including firmware, hardware, and/or executing software instructions to implement the functionality described herein, such as a computer server, a desktop computing device, a laptop computing device, a smartphone, a computing tablet, or the like. The quantum computing system 10 includes the processor device(s) 12, the system memory 14, and a system bus 65. The system bus 65 provides an interface for system components including, but not limited to, the system memory 14 and the processor device(s) 12. The processor device(s) 12 can be any commercially available or proprietary processor.

The system bus 65 may be any of several types of bus structures that may further interconnect to a memory bus (with or without a memory controller), a peripheral bus, and/or a local bus using any of a variety of commercially available bus architectures. The system memory 14 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the quantum computing system 10. The volatile memory 68 may also include a high-speed RAM, such as static RAM, for caching data.

The quantum computing system 10 may further include or be coupled to a non-transitory computer-readable storage medium such as the storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like.

A number of modules can be stored in the storage device 72 and in the volatile memory 68, including an operating system and one or more program modules, such as the quantum token generating service module 30, which may implement the functionality described herein in whole or in part. All or a portion of the examples may be implemented as a computer program product 75 stored on a transitory or non-transitory computer-usable or computer-readable storage medium, such as the storage device 72, which includes complex programming instructions, such as complex computer-readable program code, to cause the processor device(s) 12 to carry out the steps described herein. Thus, the computer-readable program code can comprise software instructions for implementing the functionality of the examples described herein when executed on the processor device(s) 12. The processor device(s) 12, in conjunction with the quantum token generating service module 30 in the volatile memory 68, may serve as a controller, or control system, for the quantum computing system 10 that is to implement the functionality described herein.

Because the quantum token generating service module 30 is a component of the quantum computing system 10, functionality implemented by the quantum token generating service module 30 may be attributed to the quantum computing system 10 generally. Moreover, in examples where the quantum token generating service module 30 comprises software instructions that program the processor device(s) 12 to carry out functionality discussed herein, functionality implemented by the quantum token generating service module 30 may be attributed herein to the processor device(s) 12.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 12 through an input device interface 76 that is coupled to the system bus 65 but can be connected by other interfaces such as a parallel port, an Institute of Electrical and Electronic Engineers (IEEE) 1394 serial port, a Universal Serial Bus (USB) port, an IR interface, and the like. The quantum computing system 10 may also include the communications interface 78 suitable for communicating with a network as appropriate or desired. The quantum computing system 10 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A computer-implemented method, comprising:
   responsive to a request for instantiation of a quantum token generating service from an authenticating computing system, instantiating, by a quantum computing system comprising one or more processing devices, an instance of the quantum token generating service, wherein:
   instantiating the instance of the quantum token generating service comprises reserving, by the quantum computing system, a set of qubits for the instance of the quantum token generating service that are accessible to the authenticating computing system;
   determining, by the quantum computing system, that the authenticating computing system has accessed the set of qubits via the instance of the quantum token generating service to generate a first token; and
   applying, by the quantum computing system, electromagnetic bias to a qubit of the set of qubits to weight the qubit such that each subsequent token generated with the instance of the quantum token generating service is different than the first token.

2. The computer-implemented method of claim 1, wherein, prior to instantiating the instance of the quantum token generating service, the method comprises receiving, by the quantum computing system, the request for instantiation of the quantum token generating service, wherein the request is indicative of a maximum number of tokens N to be generated with the instance of the quantum token generating service.

3. The computer-implemented method of claim 2, wherein receiving the request for instantiation of the quantum token generating service further comprises receiving, by the quantum computing system, a request to include a qubit of a first qubit type in the set of qubits to be reserved for the instance of the quantum token generating service;
   wherein reserving the set of qubits for the instance of the quantum token generating service comprises reserving, by the quantum computing system, a set of qubits for the instance of the quantum token generating service that comprises a qubit of the first qubit type.

4. The computer-implemented method of claim 3, wherein determining that the authenticating computing system has accessed the set of qubits further comprises determining, by the quantum computing system, that the authenticating computing system has verified that the set of qubits includes the qubit of the first qubit type.

5. The computer-implemented method of claim 2, wherein reserving the set of qubits comprises reserving, by the quantum computing system, a set of M qubits for the instance of the quantum token generating service that are accessible to the authenticating computing system, wherein $2^M = N$.

6. The computer-implemented method of claim 2, wherein the maximum number of tokens N to be generated with the instance of the quantum token generating service comprises a maximum number of tokens N generated to handle valid authentication requests with the instance of the quantum token generating service.

7. The computer-implemented method of claim 5, wherein the method further comprises:
   determining, by the quantum computing system, that the authenticating computing system has accessed the set of qubits via the instance of the quantum token generating service to generate the maximum number of tokens N to be generated with the instance of the quantum token generating service; and
   de-instantiating, by the quantum computing system, the instance of the quantum token generating service.

8. The computer-implemented method of claim 7, wherein de-instantiating the instance of the quantum token generating service comprises releasing, by the quantum computing system, the reservation on the set of qubits for subsequent access by other computing entities.

9. The computer-implemented method of claim 1, wherein determining that the authenticating computing system has accessed the set of qubits further comprises:
   receiving, by the quantum computing system, an access request from the authenticating computing system;
   placing, by the quantum computing system, the set of qubits into a first state of superposition; and
   receiving, by the quantum computing system, information indicating that the authenticating computing system has accessed the set of qubits via the instance of the quantum token generating service to generate the first token, wherein the first token is based on the first state of superposition of the set of qubits.

10. The computer-implemented method of claim 9, wherein applying the electromagnetic bias to the set of qubits applying, by the quantum computing system, the electromagnetic bias to the set of qubits to weight the qubit of the set of qubits such that each subsequent state of superposition of the qubits is different than the first state of superposition of the qubits.

11. The computer-implemented method of claim 10, wherein the method further comprises:
- receiving, by the quantum computing system, a second access request from the authenticating computing system;
- placing, by the quantum computing system, the set of qubits into a second state of superposition; and
- receiving, by the quantum computing system, information indicating that the authenticating computing system has accessed the set of qubits via the instance of the quantum token generating service to generate a second token, wherein the second token is based on the second state of superposition of the set of qubits, and wherein the second token is different than the first token.

12. The computer-implemented method of claim 1, wherein determining that the authenticating computing system has accessed the set of qubits via the instance of the quantum token generating service comprises:
- receiving, by the quantum computing system, information indicating that the authenticating computing system has accessed the set of qubits via the instance of the quantum token generating service to generate a first token.

13. A non-transitory computer-readable storage medium that includes executable instructions to cause one or more processor devices of a quantum computing system to:
- responsive to a request for instantiation of a quantum token generating service from an authenticating computing system, instantiate an instance of the quantum token generating service, wherein:
- instantiating the instance of the quantum token generating service comprises reserving a set of qubits for the instance of the quantum token generating service that are accessible to the authenticating computing system;
- receive information indicating that the authenticating computing system has accessed the set of qubits via the instance of the quantum token generating service to generate a first token; and
- apply electromagnetic bias to a qubit of the set of qubits to weight the qubit such that each subsequent token generated with the instance of the quantum token generating service is different than the first token.

\* \* \* \* \*